Figure 1:
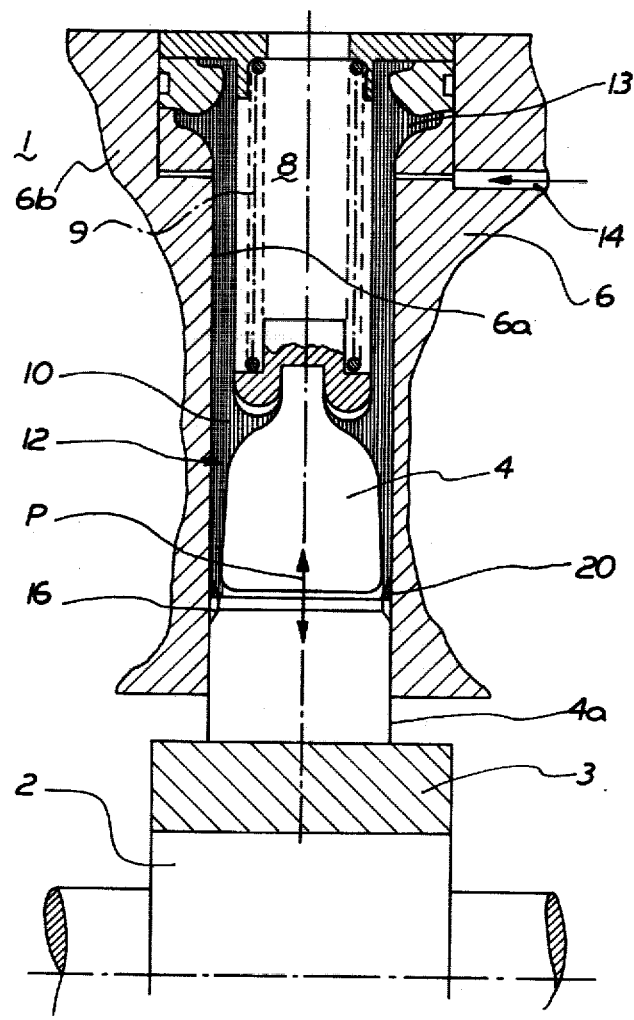

United States Patent [19]

Frey

[11] 4,327,629
[45] May 4, 1982

[54] SEAL FOR A CYLINDER-PISTON ARRANGEMENT

[75] Inventor: Bernhard Frey, Schaffhausen, Switzerland

[73] Assignee: Hydrowatt Systems Limited, London, England

[21] Appl. No.: 138,573

[22] Filed: Apr. 9, 1980

[30] Foreign Application Priority Data

Apr. 18, 1979 [CH] Switzerland ............... 3633/79

[51] Int. Cl.³ ............... F01B 19/04; F01M 1/04
[52] U.S. Cl. ............... 92/86.5; 92/90; 92/153; 92/99
[58] Field of Search ........... 92/86.5, 89, 90, 93–96, 92/98 R, 98 D, 99, 156, 102, 160, 153

[56] References Cited

U.S. PATENT DOCUMENTS

| | | | |
|---|---|---|---|
| 305,214 | 9/1884 | Meckert | 92/90 X |
| 1,085,818 | 2/1914 | Oxnard | 92/99 X |
| 2,027,979 | 1/1936 | Hopkins | 92/153 X |
| 3,241,379 | 3/1966 | Rietdijk et al. | 92/98 D X |
| 3,478,649 | 11/1969 | Lewis | 92/99 X |

FOREIGN PATENT DOCUMENTS

| | | | |
|---|---|---|---|
| 247666 | 10/1963 | Australia | 92/90 |
| 584025 | 9/1933 | Fed. Rep. of Germany | 92/99 |

*Primary Examiner*—Robert S. Ward, Jr.
*Attorney, Agent, or Firm*—Yount & Tarolli

[57] ABSTRACT

An apparatus comprising a cylinder, a piston located in part in the cylinder and movable relative thereto, an elastic tube member sealingly engaging the piston and the cylinder at spaced locations and at least partially defining a working chamber, the tube member stretching and contracting and the working chamber varying in volume upon relative movement of the piston and the cylinder, the tube member having a portion sliding against the inner wall of the cylinder as the volume of the working chamber varies and a ring member encircling the tube member and located between the tube member and the cylinder inner wall in the connection region of the tube member and the piston.

11 Claims, 5 Drawing Figures

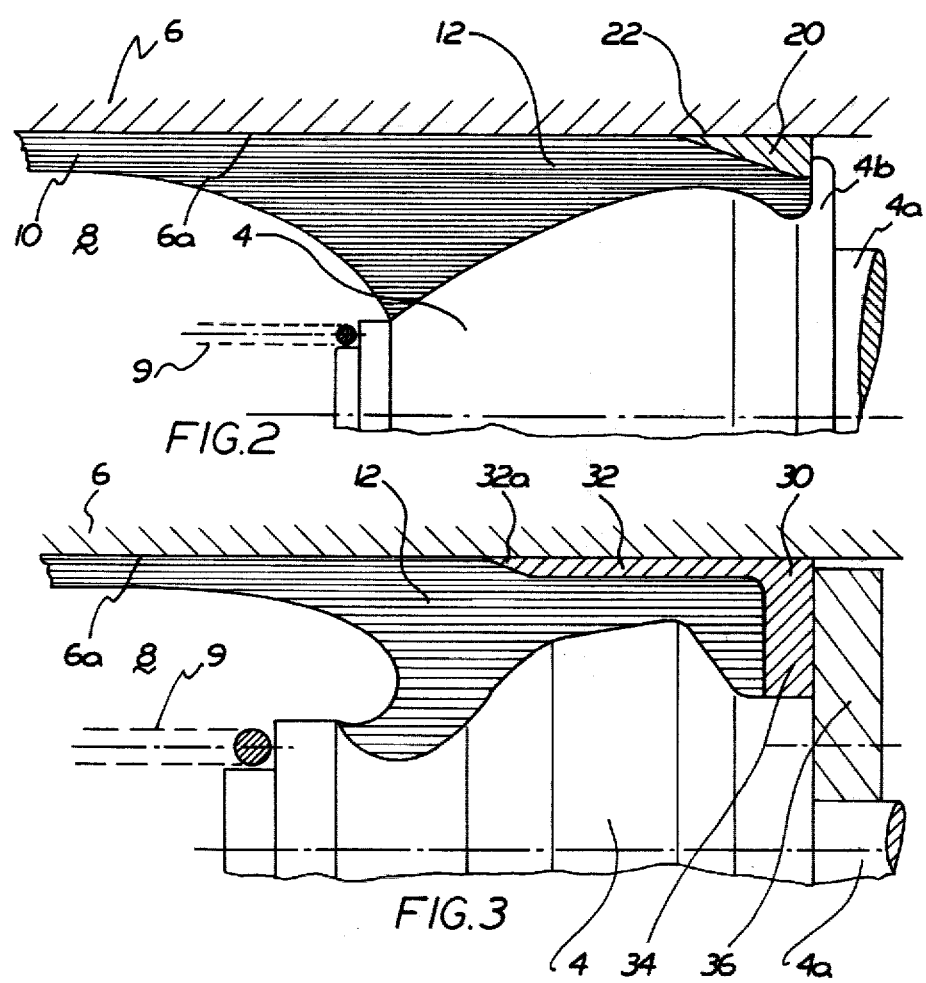

SEAL FOR A CYLINDER-PISTON ARRANGEMENT

The invention refers to a seal for a cylinder-piston arrangement having two working members movable relatively to one another and having a sealing tube which bounds a working space and has a positive connection, in particular also a connection of the substance of the material, to at least a first one of the two working members, and under the pressure in the working space, preferably via a lubricant, bears against a bearing surface formed by the second of the two working members.

Cylinder-piston arrangements of the aforesaid kind find employment particularly as pumps and motors for working liquids which are under high pressure. The sealing tube connected to the two working members, i.e., piston and cylinder, takes part by elastic compression or stretching respectively in its longitudinal direction in the periodic alteration in the working space and brings about a hermetic sealing which at high pressures can be achieved in other ways only with difficulty. In the case of the conveyance of corrosive or poisonous liquids the hermetic sealing which can hereby be achieved is of significance too.

A considerable problem in the case of cylinder-piston arrangements of the present kind at high working pressures is the sliding motion occurring under correspondingly high contact pressure between the outer face of the sealing tube and the bearing surface. In particular in the connection region of the sealing tube to the working member which moves with respect to the bearing surface a high loading of the material of the tube results, because the sliding speed of the surface of the tube here corresponds with the full value of the relative speed of the working member in question with respect to the bearing surface (in the direction towards the opposite point of connection onto the working member forming the bearing surface this sliding speed diminishes with the degree of deformation of the tube down to zero). Even in the case of introduction of a lubricant liquid into the clearance volume between the sealing tube and the bearing surface with discharge from this clearance volume in the connection region between the tube and the first working member critical deformation and sliding conditions result here because the flexible material of the sealing tube under the action of the working pressure is still being pressed strongly against the bearing surface, whilst on the other hand the lubricant pressure close to the discharge opening from the clearance volume already drops off. Under certain circumstances therefore in the transition region direct contact between the material of the seal and the bearing surface with corresponding mixed friction and wear of the surface of the tube may result, above all in combination with the heating of the material of the seal caused by high-pressure friction. On the other hand the outwards deformation of the material of the seal in the region of the discharge out of the clearance volume cannot be suppressed at option because here if necessary a throttling action with respect to the escaping lubricant liquid is striven for by narrowing of the clearance volume. Such a throttle, self-adjusting under the action of deformation from working pressure, offers the advantage of a reliable maintenance of pressure and maintenance of the distance between the surface of the tube and the bearing surface in the main region of the surface of the tube lying at the back of it. But the outwards deformation of the material of the tube leads again to the danger of contact with the bearing surface with the injurious consequences of it which have been mentioned.

The object of the invention is therefore the creation of a seal for cylinder-piston arrangements having a sealing tube, which is distinguished by low susceptibility to wear and damage of the sealing tube in the region of maximum sliding speed with respect to the bearing surface. This object is achieved by locating between the inner wall of the cylinder and the sealing tube in the connection region of the sealing tube with the piston an intermediate part encircling the sealing tube.

The arrangement of an intermediate part embracing the sealing tube in its connection region offers first of all the possibility of screening this exposed section of the material of the tube against contact with the bearing surface and hence against damage. For this purpose an execution of the intermediate part from slide-promoting material particularly comes into consideration, especially a slide-promoting plastics, preferably from polytetrafluroethylene or a similar polymer plastics. Independently of that, but if necessary even in addition, such an intermediate part may exert a restraining action directed radially inwards on the material of the tube in the connection region and thereby against the radially outwards directed components of the working pressure prevent the bulging of the material of the tube and possible contact of it with the bearing surface. In order to do that the preferably annular intermediate part is advantageously mounted with compressive prestress directed radially inwards on the connection region of the sealing tube. If in spite of that, sliding contact occurs against the bearing surface, the intermediate part again takes over its protective function with respect to the material of the tube. As a further function such an intermediate part may with deliberately permitted radial expansion under the action of the working pressure acting on the inside of it, take over the formation of a self-adjusting throttle for a lubricant escaping from the clearance volume between the tube and the bearing surface. In order to do this the section of the intermediate part next to the working space is advantageously made comparatively thinwalled in the form of a sleeve or a collar tapering off to a point, which is expanded radially at its edge region next to the working space and forms here an annular throttling gap. The transfer of the working pressure to the inner face of the intermediate part may be brought about by the elastic material of the connection region of the sealing tube, which wholly or partially fills the interior of the intermediate part. As has been said, in practice by appropriate shaping and dimensioning of the intermediate part, in particular its annular or wall-like part which extends along the circumference of the bearing surface, combinations of the various functions mentioned may deliberately be adjusted.

Further features and advantages of the invention are explained with the aid of the embodiments illustrated diagrammatically in the drawings. In these there is shown in:

FIG. 1—an axial section through a cylinder-piston arrangement having a sealing tube as an example of application for the insertion of an annular intermediate part;

FIG. 2—on a larger scale a partial axial section of the connection region of the sealing tube onto a working member made as a piston, with an annular intermediate part inserted;

FIG. 2a—a modified cross-sectional shape of an annular intermediate part with an auxiliary spring;

FIG. 2b—a further execution of the cross-section of an annular intermediate part, likewise with an auxiliary spring ring; and FIG. 3—a partial axial section similar to FIG. 2 with a can-shaped intermediate part in the connection region of the sealing tube.

In accordance with FIG. 1 the cylinder-piston arrangement 1 acting, for example, as pump, is driven by an eccentric 2 via a non-rotating bearing ring 3 in the direction of the arrow P. A first working member 4, here made as a piston, bears downwards by a guide and ram section 4a against the bearing ring 3 and hence executes an oscillating working motion in accordance with the arrow P. A second working member 6 made as a cylinder encloses a working space 8 inside which is accommodated a spiral compression spring 9 holding the piston working member 4 in contact against the bearing ring 3. Inside the cylinder working member 6 a sealing tube 10 is arranged, which by its outer face bears radially against the cylindrical bearing surface 6a of the working member 6 under the action of the pressure in the working space 8. The bottom end of the sealing tube 10 by a connection region 12 has a connection of the substance of the material, preferably by vulcanization, to the piston working member 4 and hence is subjected to an axial stretching and compression in accordance with the working motion corresponding with the arrow P. At the top end the sealing tube 10 is connected solidly by a connection region 13 with a clamp connection or a connection of the substance of the material to the head section 6b of the cylinder working member 6. Hence the working space 8 is hermetically sealed all round by the sealing tube 10 which takes part by its axial deformation in the periodic alteration of the working space. In a way not shown in greater detail a lubricant liquid is forced via a connection 14 into the clearance volume between the outer face of the sealing tube 10 and the bearing surface 6a and flows down through this clearance volume in the axial direction and at the bottom end of the connection region 12 of the sealing tube flows away via a throttle point into a low pressure chamber, for example, an annular space 16 provided with outlet channels (not shown). Because of this throttling of the discharge a lubricant pressure may be developed in the clearance volume between the sealing tube and the bearing surface, which is in equilibrium with the pressure in the working space, to exclude contact and mixed friction between the tube and the bearing surface. In order to do that an appropriate dimensioning and adjustment of the elasticity of the throttle point in the connection region 12 is necessary, which is achieved by the insertion of an annular intermediate part 20 which is seated, for example, with radial prestress on the material of the tube.

The construction and arrangement of the annular intermediate part 20 may be seen in detail from FIG. 2. According to that the cross-section of this intermediate part is made triangular with the outside arranged in parallel with the direction of the generatrix of the bearing surface 6a and the end section tapering out into a sharp edge in the direction of the working space 8. On the opposite side the intermediate part exhibits a side of the cross-section running radially, which bears against an axial stop 4b on the piston working member 4 against the axial component of the pressure prevailing in the working space 8. This pressure is transmitted by the elastic material of the connection region 12 of the sealing tube to the inside of the intermediate part 20. A radially expanding component of the pressure acting upon this annular body thereby also results, which in the case of appropriately elastic deformability may be made use of for direct participation of the outer face of the intermediate part and in particular of the edge section 22 of it next to the working space, in the formation of a self-adjusting discharge throttle for the lubricant flowing along the bearing surface 6a from left to right in the sense of FIG. 2. On the contrary a comparatively great stiffness against stretching of the annular body leads to an excessive constrictive function or restraining function in respect of the elastic material of the connection region 12, so that the throttling action can be adjusted by radial bulging of the material of the seal independently of the more or less complicated shape of the profile of the axial section and of the area of vulcanization on the piston working member.

The radial prestress effect and the stiffness against stretching of the intermediate part can be adapted to the requirement at the time with the aid of auxiliary springs. FIG. 2a shows a comparatively weakly acting annular spiral tension spring 26 in the axial section through an annular intermediate part 20a having a trapezoidal profile. The auxiliary spring 26 is accommodated here in an outer circumferential groove in the annular body. FIG. 2b shows a modified execution of the profile of an annular intermediate part 20b having lower radial extensibility because of a more massive shape of cross-section, furthermore because of a massive spring ring accommodated in a corresponding circumferential groove. Such an execution can scarcely be called upon for the formation of a throttle under radial expansion but brings about a stiff constriction and restraint of the connection region of the sealing tube against bulging under the working pressure. The radially expandable executions as FIG. 2 and FIG. 2a offer on the contrary the further particular advantage that the annular body can during assembly be forced axially onto the piston which can be produced in one piece, past the greatest diameter of the axial stop 4b. On the other hand fitting is also possible of the smaller-diameter section of piston on the side next the working space, in the state before the vulcanization onto the connection region of the sealing tube. The centreing and embedding into the mass of the seal is then effected by the vulcanization. In this case a connection of the substance of the material does not readily result with the plastics of the intermediate part, but only to the surface of the piston working member. A sufficient radial prestress leads nevertheless to sealing against the lubricant liquid from the clearance volume between the sealing tube and the bearing surface. On the other hand a certain admission under the annular body of the intermediate part, of the lubricant liquid under pressure, for assisting the radial expansion during throttle formation may be desirable.

In the case of the execution as in FIG. 3 the intermediate part 30 is can-shaped and provided with a thinwalled and therefore easily stretchable wall part 32 extending along the bearing surface 6a, as well as with a thickwalled and stiff bottom or flange part 34. The latter is fastened by means of a thrust washer and a bolted joint (not shown) to the piston working member 4 and imparts radial stiffness to the outer end section of the wall part. The edge section 32a of the wall part 32 next the working space on the contrary expands comparatively widely radially under the action of the working pressure in the space 8 or respectively the corresponding pressure in the flexible material of the connection region 12 of the sealing tube and thus may form mainly or exclusively a self-adjusting throttle. If necessary for this purpose a shape of the wall part 32 may advantageously be provided which is already in the unstressed state slightly conical, diverging towards the working space.

For the rest the interior of the can-shaped intermediate part may if necessary be kept wholly or partially free of the material of the sealing tube if expansion for the formation of a throttle is effective in some other way. Under certain circumstances, for doing this the pressure of the lubricant entering from the clearance volume comes into consideration, which depends upon the pressure in the working space or respectively is in equilibrium with it.

Furthermore the heat-insulating action of the intermediate part is particularly advantageous, especially also the execution as in FIG. 3 with its wide wall part, against a flow of heat from the cylinder or respectively—as regards the bottom part—from the driving cam with its heat of friction. This screening against additional heating contributes considerably to the resistance of the material of the tube in the connection region.

I claim:

1. An apparatus comprising a piston and a cylinder, said piston being in part located in said cylinder and said piston and said cylinder being relatively movable, an elastic tube member sealingly engaging said piston and said cylinder at spaced locations and at least partially defining a working chamber, said tube member stretching and contracting and said working chamber varying in volume as said piston and said cylinder move relatively, said tube member having a surface portion sliding against the inner wall of said cylinder as the volume of said working chamber varies, and a ring member encircling said tube member and located between said tube member and said inner wall of said cylinder in the region of connection of said tube member with said piston for minimizing outward deformation of said tube member, said ring member being elastically deformable and having a compression prestress directed radially inward.

2. An apparatus as set forth in claim 1, wherein a lubricant fluid film is provided between said tube member and said inner wall of said cylinder.

3. An apparatus as set forth in claim 2 wherein said lubricant fluid film is created by lubricant fluid flow, and said ring member is located in the area of discharge of said lubricant fluid flow from between said tube member and said inner wall.

4. An apparatus as set forth in claim 1 wherein said ring member is provided with spring means acting radially inward.

5. An apparatus as set forth in claim 1 wherein said ring member is made from a polymer plastic.

6. An apparatus as set forth in claim 5 wherein said polymer plastic is polytetrafluroethylene.

7. An apparatus as set forth in claim 1 wherein said ring member is supported at least partially by an axial stop integral with the piston for preventing axial deformation of said ring member under the pressure in said working chamber.

8. An apparatus as set forth in claim 7 wherein said ring member has a triangular cross section with one side of said triangular cross section extending approximately parallel to said inner wall of said cylinder, and another side of said triangular cross section extending radially inward from said one side and lying on said axial stop.

9. An apparatus as set forth in claim 1 wherein said ring member is can-shaped with a comparatively thin wall part extending along said inner wall of said cylinder, and a comparatively thick wall part bearing against the lower radial side of said tube member and fastened to said piston.

10. An apparatus comprising a piston and a cylinder, said piston being in part located in said cylinder and said piston and said cylinder being relatively movable, an elastic tube member sealingly engaging said piston and said cylinder at spaced locations and at least partially defining a working chamber, said tube member stretching and contracting and said working chamber varying in volume as said piston and said cylinder move relatively, said tube member having a surface portion sliding against the inner wall of said cylinder as the volume of said working chamber varies, a lubricant fluid film between said surface portion of said tube and said inner wall of said cylinder created by lubricant fluid flow therebetween, and an elastically deformable ring member encircling said tube member and located between said tube member and said inner wall of said cylinder in the region of connection of said tube member with said piston and defining a throttling area for throttling lubricant fluid flow from the area between said tube member and said inner wall.

11. An apparatus as set forth in claim 10, wherein said ring member has a compression prestress.

* * * * *